June 9, 1931.　　　J. C. CARLIN　　　1,809,106

TIRE BEAD AND METHOD OF MAKING SAME

Filed Aug. 10, 1929

INVENTOR
J. C. Carlin,
BY Robert M. Pierson,
ATTORNEY

Patented June 9, 1931

1,809,106

UNITED STATES PATENT OFFICE

JAMES C. CARLIN, OF GLADWYNE, PENNSYLVANIA, ASSIGNOR TO LEE RUBBER & TIRE CORPORATION, OF CONSHOHOCKEN, PENNSYLVANIA, A CORPORATION OF NEW YORK

TIRE BEAD AND METHOD OF MAKING SAME

Application filed August 10, 1929. Serial No. 384,899.

This invention relates to the manufacture of inextensible bead cores and their incorporation in the edges of pneumatic tires, particularly in the so-called flat or drum-built tire bands adapted to be expanded into tire shape.

It is generally necessary to combine a soft filler element with the flexible wire portion of the bead core, especially when using two or more turns of flat wire shape, said filler occupying the triangular space between the fabric plies at the apex of the core and serving to avoid a sawing action of the wire on the fabric during operation of the tire. The wire tape is commonly coated with plastic rubber in a tubing machine before being wound on itself to make a ring.

In a drum-built tire, this soft filler is located at the inner edge of the wire element during the make-up of the tire band, and it becomes shifted to the top of said wire element when the beads are turned through an angle of approximately 90 degrees in shaping the band to tire form, the wire tape being shifted from a horizontal to a vertical plane. The practice heretofore has been to use a separately inserted filler, and the application of such filler to the wire, as well as the incorporation of the bead core elements in the tire band, have presented some difficulties involving a relatively-high labor cost for this operation and often more or less defective workmanship.

The object of my invention is to overcome these difficulties, to decrease the labor cost by associating the filler as a unit with the wire strip before winding the latter into a ring, and to improve the quality of the product by minimizing the opportunities for defective workmanship.

Of the accompanying drawings.

Figures 2, 3:
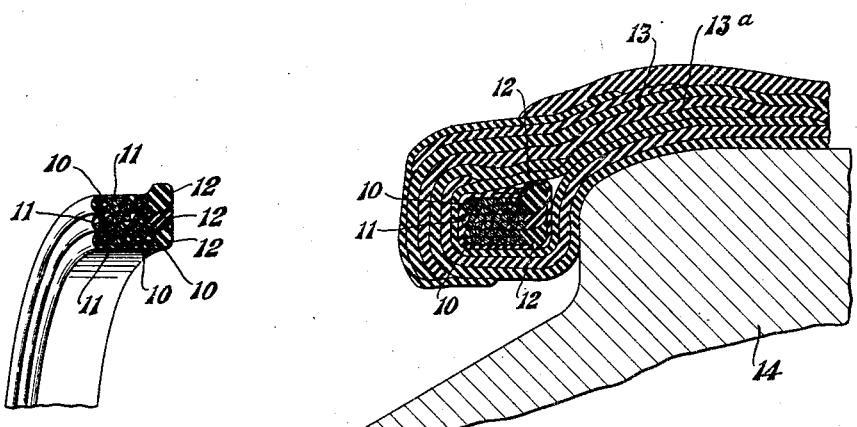
Fig. 2 is a cross-sectional perspective view of the bead ring composed of several turns of the composite strip wound up on itself.
Fig. 3 is a fragmentary sectional view of a drum-built tire-forming band having the bead ring of Fig. 2 incorporated therein.
Figure 4:
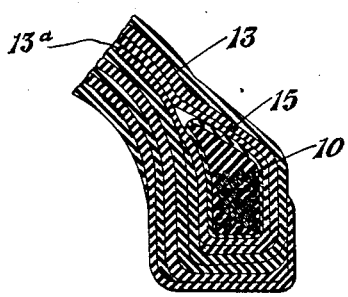
Fig. 4 is a fragmentary sectional view of the edge of a shaped tire casing with the bead incorporated.

Cross-hatching of the carcass and surface plies is omitted in Figs. 3 and 4 for the sake of clearness.

Figure 1:
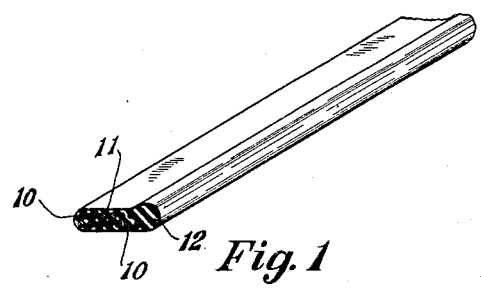
Fig. 1 is a cross-sectional perspective view of a portion of the plastic-covered wire bead strip having a filler strip formed thereon.

Referring to Fig. 1, 10 is the usual flat bead strip of flexible wire strands, fabricated as by braiding or weaving, 11 is plastic, vulcanizable rubber compound covering said strip and filling its interstices, and 12 is a marginal strip of said compound located at one edge of the wire strip and integral with the covering 11. In Fig. 2, several turns of the bead strip represented in Fig. 1 are shown wound one upon the other to make a bead core ring. The various plies of rubberized carcass fabric are shown at 13, and 13ª is the flipper or rubberized fabric covering for the bead core. 14 is a tire-band building drum. As shown in Fig. 4, when the tire band is formed into tire shape and vulcanized, the several component filler strips 12 will have been shifted to the top side or outer periphery of the wire ring and consolidated in a filler 15 of triangular section filling the space at the apex of the bead core on the outer periphery of the wire ring.

The method of procedure is as follows:

The fabricated wire strip 10 making up the inextensible body of the bead core is passed through a specially shaped die in a tubing machine and a coating of soft plastic rubber 11 is extruded thereon. The die is of such shape as to cause an excess of the soft rubber to be extruded at one edge of the wire strip as indicated at 12 in Fig. 1.

The strip may be cut into desired lengths or led directly onto a drum or form where it is built into a bead ring or grommet by winding two or more turns, one upon the other, as shown in Fig. 2, the several component filler strips 12 collectively constituting a laminated soft filler at the edge of the laminated wire ring.

The flipper strip 13ª is next wrapped about the bead grommet, the flippered bead core is applied to the underlying carcass plies with the soft filler at the inner edge of the wire ring, the outer carcass plies are wrapped in place and the edges of the carcass plies are wrapped about the bead core, the outer strip of chafing fabric is applied to complete the bead and the tread and side-wall rubber are then applied to complete the tire band in the usual manner.

When the tire band is removed from the drum 14 and formed into tire shape by the vacuum method or otherwise, the beads are turned through an angle of approximately 90° to assume the relative position shown in Fig. 4, the wires being more or less shifted from a horizontal to a vertical plane and the filler 15 being shifted to the outer periphery of the wire ring. Vulcanization of the tire casing is then effected to consolidate all of the parts.

By simultaneously covering the wire strip with plastic material and integrally forming an excess strip of said material on the edge of the wire, then winding the composite strip into a ring and incorporating the bead core in the tire as described, my invention eliminates some troublesome steps in the manufacture of bead cores and tires, which have been involved in the prior method of separately applying the filler strip after the bead ring is made. The labor cost is thereby materially reduced and less skill is demanded on the part of the bead builders and tire builders in attaining the desired quality of workmanship.

I claim:—

1. The method of making tire bead cores which comprises covering a flexible wire strip with plastic material and simultaneously applying an additional soft filler of said material to the edge of said strip.

2. The method of making tire bead cores which comprises simultaneously covering a flexible wire strip with plastic material, and uniting a soft filler-forming margin of said material with the edge of said strip, by extrusion.

3. The method of making a combined wire bead core and filler which comprises covering a flexible wire strip with plastic material, simultaneously forming an excess of said material into a plastic margin on the edge of said strip, and winding said strip upon itself as a ring having a laminated soft edging to constitute the bead filler.

4. The method of making beads in drum-built tires which comprises producing a laminated ring of rubber-covered wire tape having a laminated rubber edging to form the bead filler, applying said ring, with its filler at the inner edge, to the underlying carcass plies of a tire-forming band, wrapping the inner and outer carcass plies about said ring, expanding said band to tire shape and bringing the filler to the outer periphery of the wire element.

5. A flat, fabricated wire strip for bead cores having a plastic covering thereon, said covering being integrally extended at one edge to form a bead filler.

6. An intermediate product in the formation of tire beads which comprises a wire strip having a soft edging, said strip being wound upon itself and the several plies of the edging collectively constituting a soft filler.

In witness whereof I have hereunto set my hand this 7th day of August, 1929.

JAMES C. CARLIN.